United States Patent [19]
Baldoni

[11] 3,949,617
[45] Apr. 13, 1976

[54] ELECTROMECHANICAL SPEED VARIATOR

[76] Inventor: Carlo Baldoni, Via Musone, 76, Loreto (Ancona), Italy

[22] Filed: Mar. 20, 1974

[21] Appl. No.: 453,162

[30] Foreign Application Priority Data
Mar. 21, 1973 Italy .................................. 21905/73

[52] U.S. Cl. ........................ 74/206; 74/209; 74/210
[51] Int. Cl.²F16H 13/02; F16H 13/00; F16H 13/12
[58] Field of Search .............. 74/206, 202, 209, 210; 274/4 D, 4 J, 17

[56] References Cited
UNITED STATES PATENTS

| | | | |
|---|---|---|---|
| 2,547,666 | 4/1951 | Schneider | 74/209 |
| 2,603,977 | 7/1952 | Cain | 74/206 |
| 2,732,724 | 1/1956 | Tateishi | 74/206 |
| 2,935,879 | 5/1960 | Morrison et al. | 74/209 |
| 3,815,430 | 6/1974 | Strobel et al. | 74/206 |

Primary Examiner—Samuel Scott
Assistant Examiner—Allan R. Burke
Attorney, Agent, or Firm—Bacon & Thomas

[57] ABSTRACT

An electromechanical speed variator for apparatus having a device suitable to be rotated at two or more speeds different from one another, comprising a first electric drive motor for directly rotating said device at a first speed; a second electric drive motor for indirectly rotating said device at a second speed; a drive wheel connected to the shaft of one of said motors and a friction wheel idly rotably carried by a moving support between a first inoperative position remote from said drive wheel and a second operative position, thereat contacting said drive wheel and respectively the shaft of said other electric drive motor; and control means comprising an electromagnet, and return spring means acting on the moving support of the friction wheel to move the latter to either of its two said positions.

7 Claims, 6 Drawing Figures

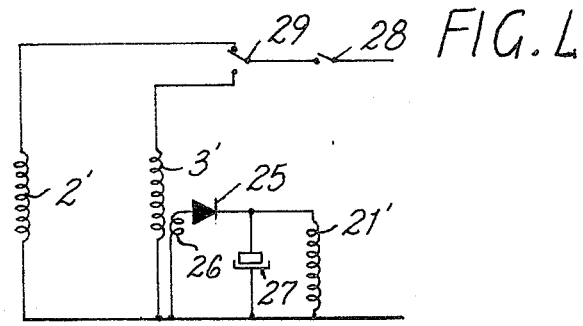
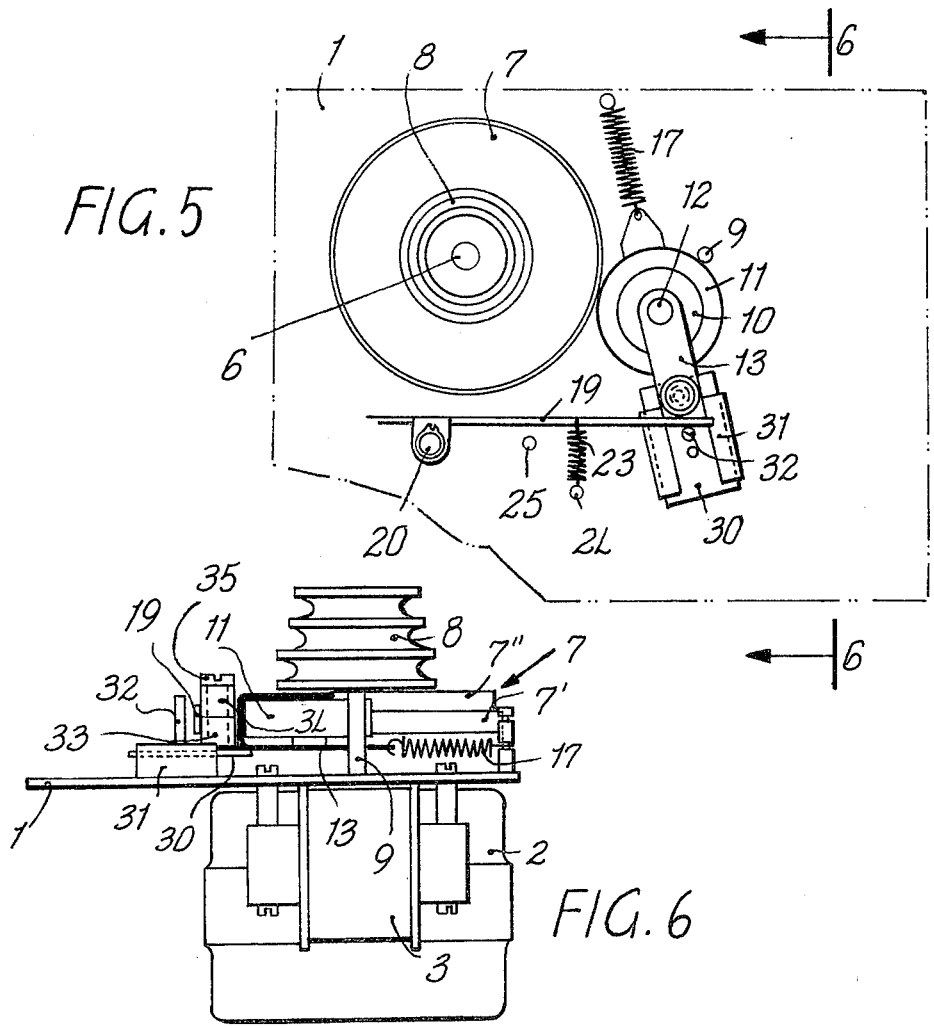

ELECTROMECHANICAL SPEED VARIATOR

This invention relates to an electromechanical speed variator for apparatus having a device suitable to be rotably driven at at least two speeds different from each other. Particularly, a speed variator according to the invention has been designed for electro-musical applications, such as to provide vibration effects. However, a speed variator according to the invention can be adapted for other applications, such as record-player control, variable capacitor control, and pulsating light control or the like.

For example, in the electro-musical art, devices are known for providing a sound vibration effect.

For example, sound vibration effect is provided by rotation of a loudspeaker, or by rotation of a fan in front of a loudspeaker picking up the sound and distributing it through 160°.

In order to provide a different vibration effect, it is necessary to change the speed of rotation for said loudspeaker or fan. As a piece of music is performed, this would afford the provision of particular sound effects by varying the speed of the vibration generating device. Although particularly referring to vibration generating apparatus, it should be understood that an electromechanical speed variator according to the invention can be applied in a wider meaning.

Generally, an electromechanical speed variator for apparatus having a device suitable to be rotated at two or more speeds different from one another, according to the invention, is characterized by comprising: a first electric drive motor for directly rotating said device at a first speed; a second electric drive motor for indirectly rotating said device at a second speed; a drive wheel connected to the shaft of one of said motors and a friction wheel idly rotably carried by a moving support between a first inoperative position remote from said drive wheel and a second operative position contacting with said drive wheel and the shaft of said other electric motor, respectively, for movement transmission; and control means comprising an electromagnet and spring return means acting on the moving support of the friction wheel to move the latter to either of its two said positions.

Since the drive wheel is generally connected to the shaft of the electric drive motor for the pulley driving the rotating device, while the other motor can be indirectly connected by the friction or planet wheel, and since it is the first motor which determines the higher speeds, this would cause the friction or planet wheel to be operated only when a low speed operation is concerned. This causes a less wear in the rubber lining the edge of the friction wheel, a lower overheating of the materials being used and a larger duration in time.

Additionally, as the friction or planet wheel is movably carried, a self-compensation in wear is provided and hence a speed constancy in time.

Several embodiments of an electromechanical speed variator according to the invention will now be described with reference to the accompanying drawings, in which:

FIG. 4 is the wiring diagram for controlling the speed variator according to the invention;

FIG. 5 is a fragmentary plan view showing a second embodiment of the speed variator according to the invention; and FIG. 6 is an end view taken along line 6—6 of FIG. 5.

Figure 1:
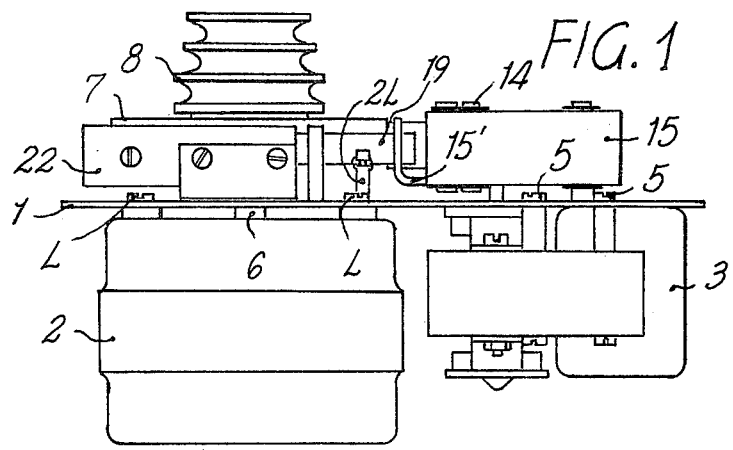
FIG. 1 is a side view showing a first embodiment of a speed variator according to the invention.
Figure 2:
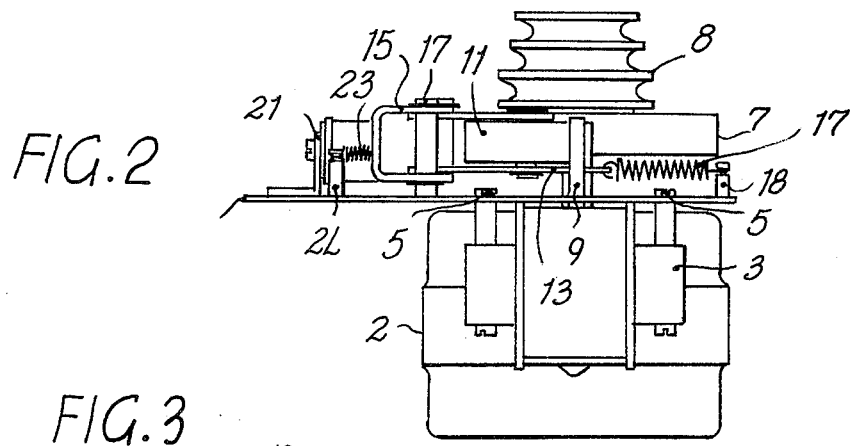
FIG. 2 is an end view of the speed variator shown in FIG. 1.
Figure 3:
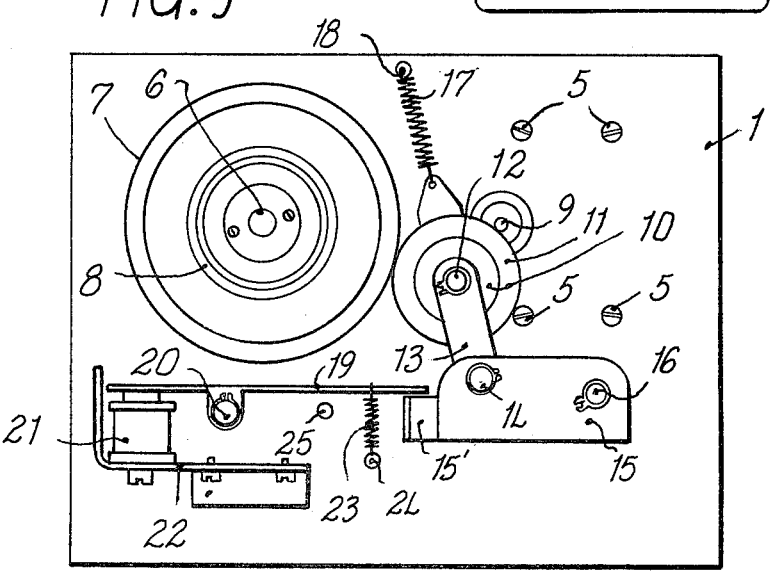
FIG. 3 is a top plan view of the speed variator shown in FIG. 1.

Referring first to FIGS. 1-3, a first embodiment of an electromechanical speed variator according to the invention will be described.

From the drawings, it will be seen that reference numeral 1 designates a frame member, such as a metal plate, carrying a first electric motor 2 and a second electric motor 3. These electric motors 2, 3 are secured to said plate 1 by screws 4 and 5, respectively, or other equivalent means.

A drive wheel 7 is keyed to the shaft 6 of the electric motor 2 and at the top has a pulley 8 provided with one or more races, this pulley being connected by a belt (not shown), or other equivalent driving system, to the rotating portion of a general device, such as the fan for sound pick up and distribution in a vibration generating device.

Unlike motor 2, the electric motor 3 has its shaft 9 free of pulleys or drive wheels, and projects for a predetermined length above and beyond the plate or frame member 1.

As shown in FIG. 3, intermediate the drive wheel 7 of motor 2 and the shaft 9 of electric motor 3, there is provided a friction or planet wheel 10, the peripheral edge of which is provided with a friction material 11, such as rubber or the like.

As initially stated, the friction wheel 10 is idly rotably carried by a moving support, to be described below, for movement between two end positions, and particularly between an operative position, shown in FIG. 3, wherein the friction wheel 10, 11 directly contacts the shaft 9 of the electric motor 3 and the drive wheel 7 of the electric motor 2 for indirect control by the electric motor 3, at which situation the electric motor 2 is de-energized as it will be appreciated from the diagram of FIG. 4, and a second or inoperative position, wherein the friction wheel 10, 11 is remote from the drive wheel 7.

More particularly, it will be seen that the friction or planet wheel 10, 11 is idly rotably carried by an axis 12 carried at the end of a rocking arm 13 which at its other end is pivoted at 14 to a support 15 which, in turn, is pivoted at 16 to the fixed plate or frame member 1 of the geared motor unit.

As shown in FIGS. 2 and 3 of the accompanying drawings, a free end of said arm 13 is connected with the end of a return spring 17 which is restrained to a pin or projection 18 fast with said plate 1. This spring 17 functions to move the friction wheel 10, 11 near the shaft 9 of motor 3 and said drive wheel 7, respectively.

From FIG. 3 it will be also seen that the rocking support 15 for the friction wheel has a projecting portion 15', against which the end of a rod 19 bears, which rod is at an intermediate position pivoted at 20 to the plate 1 of the speed variator unit.

At the other end of the control rod 19, an electromagnet 21 is provided and carried by a support 22 attached to the plate 1, as shown.

From FIG. 3 it will be also seen that said rod 19 is under the action of a return spring 23 connected at one end to said rod and at the other end to a pin or projection 24 on the plate or frame member 1. A stop 25 is provided for stopping the rod 19 at a predetermined location.

The spring 23, which is designed with a larger force than spring 17, is effective in opposite direction to the latter to move the friction wheel 10, 11 away from said drive wheel 7.

The electric circuit for the speed variator unit according to the invention is schematically shown in FIG. 4.

In FIG. 4, the windings for the electric motors 2 and 3, respectively, are shown by reference numerals 2' and 3'. Reference numeral 21' designates the winding for the electromagnet 21, which winding 21' is supplied through a diode 25 by an auxiliary winding 26 of the electric motor 3. A filter 27 is parallel connected to the electromagnet winding 21'.

Reference numeral 28 designates a general switch, while reference numeral 29 designates a switch for supplying the windings 2' and 3', respectively, of said motors 2, 3.

The operation of the device is substantially as follows: assume that the relay 21 is disactivated, that is the switch 29 is at the position as shown in FIG. 4, where it supplies the winding 2' of the electric motor 2. Since the relay 21 is disactivated, the spring 23, having a larger force than spring 17, will pull downwards the support 15 for the friction wheel 10, moving said friction wheel 10 away from the drive wheel 7. Therefore, the speed variator will provide its highest speed.

On the other hand, assume now to move the switch 29 to its other position, relative to that of FIG. 4, where the electric motor 3 is supplied and the electric motor 2 is cutoff. At this position of the switch 29, and due to the supply of the winding 3' of motor 3, also the auxiliary winding 26 is supplied and hence the winding 21' of the relay 21. Upon energization, said relay 21 will attract the metal rod 19 which, overcoming the force of the return spring 23, will release the support 15 of the friction wheel 10, 11, which is drawn by the spring 17 to the position shown in FIG. 3, where it will engage at the same time the shaft 9 of the electric motor 2 and the drive wheel 7. At this position the speed variator will provide a lower speed than the former. Thus, two different values of control speeds can be provided, whereas the other speeds can be provided by moving the belt or driving member on any of the pulleys 8 fast with the speed variator shaft.

By moving again the switch 29 to the position shown in FIG. 4, the motor 3 will be cutoff and the motor 2 connected, bringing the speed variator back to its previously described operating conditions.

A second modified embodiment is shown in FIGS. 5 and 6 of the accompanying drawings. In these figures, those parts which have been substantially unaltered, are designated by the same reference numerals of the preceding figures.

In the case shown in FIGS. 5 and 6, the friction or planet wheel 10, 11 is idly rotably carried by the arm 13 which is again pivoted to a support 30, longitudinally sliding in guides 31 attached to the speed variator plate 1. The sliding support 30 is provided with an upward facing projection 32, the rod 19 of the electromagnetic control device, previously described and not completely shown in FIG. 5 for simplicity in drawing, acting or bearing there against.

As shown in FIG. 6, the planet or friction wheel 10, 11 is secured to the arm 13 by the pin 12, as above described. A bushing 33 is secured to said arm 13, so that the latter through a spacer 34 can rotate about the screw 35 which is screwed in said sliding support 30.

By the embodiment shown in FIGS. 5 and 6, it is possible to obtain two different values of so-called low speeds. To this end, the drive wheel 7 has a first portion 7' with a given diameter, and a second portion 7" having a smaller diameter than the former. Therefore, by axially moving and suitably securing in place said friction wheel 10, 11, the latter can contact the diameter of portions 7' or 7", and at the same time the shaft 9 of motor 3. Thus, two different speeds of rotation are provided. The fastening of the friction wheel 10, 11 at the first position or the second position can be accomplished, for example, by unloosing the screw 35, unthreading the spacer 34 and bushing 33 of the support arm for the friction wheel, arranging the whole with the spacer 34 threaded on the screw 35 at a position underlying said bushing 33.

The support is now at a higher level than that of FIG. 6, with the friction wheel 10, 11 contacting the minor diameter portion 7" of the drive wheel 7.

As apparent, the foregoing matter as described and shown in the accompanying drawings, has been herein given by mere way of not limiting example, and other changes can be made; for example, instead of indirectly operating through the control rod, the electromagnetic device could directly operate on the moving support of the friction wheel, without departing for this from the covering field of the invention.

What is claimed is:

1. Apparatus for varying the speed of a drive wheel comprising:
   first electric drive motor means having a first drive shaft connected to said drive wheel for rotating said drive wheel at a first speed,
   second electric drive motor means having a second drive shaft for rotating said drive wheel at a second speed,
   a friction wheel,
   movable support means connected to support said friction wheel,
   means for moving said movable support means to a first inoperative position and a second operative position,
   said friction wheel removed from contacting said drive wheel in said first inoperative position, thereby allowing said first electric drive motor means to rotate said drive shaft at said first speed,
   said friction wheel contacting said drive wheel and said second drive shaft in said second operative position thereby rotating said drive wheel at said second speed, and electric circuit means for deactuating said first electric drive motor means substantially simultaneously with the actuation of said second electric drive motor means.

2. Apparatus for varying the speed of a drive wheel as recited in claim 8 wherein said drive wheel has a first portion of a first diameter and a second portion of a second diameter spaced axially from said first portion and said apparatus further comprises means for positioning said friction wheel for contact with said first portion of said drive wheel and said second drive shaft, and means for positioning said friction wheel for contact with said second portion of said drive wheel and said second drive shaft.

3. Apparatus for varying the speed of a drive wheel as recited in claim 1 wherein said means for moving said movable support means comprises:

an electromagnet, a rod member movable by said electromagnet for actuating the movement of said support means to one of said first and second positions, and spring bias means (23) for moving said movable support means to the other of said first and second positions.

4. Apparatus for varying the speed of a drive wheel as recited in claim 3 further comprising:

electric circuit means for actuating said first and second electric drive motor means, and means for actuating said electromagnet simultaneously with the actuation of said second electric drive motor means.

5. Apparatus for varying the speed of a drive wheel as recited in claim 3 wherein said movable support means comprises a rocking arm member, a rocking support member and a fixed plate, one end of said rocking arm member rotatably supporting said friction wheel and the other end of said rocking arm member pivotally mounted on said rocking support member, said rocking support member pivotally mounted to said fixed plate.

6. Apparatus for varying the speed of a drive wheel as recited in claim 5 wherein said rod member is movable by said spring bias means for contact with said rocking support member of said movable support means.

7. Apparatus for varying the speed of a drive wheel as recited in claim 6 further comprising additional spring bias means (17) for moving said movable support means to said one position.

* * * * *